(12) United States Patent
Gray

(10) Patent No.: US 8,421,265 B2
(45) Date of Patent: Apr. 16, 2013

(54) SYSTEM AND METHOD FOR GENERATING ELECTRICITY WITHIN A BUILDING STRUCTURE

(75) Inventor: R. O'Neal Gray, Dallas, TX (US)

(73) Assignee: Grayhawke Applied Technologies, Dallas, TX (US)

(\*) Notice: Subject to any disclaimer, the term of this patent is extended or adjusted under 35 U.S.C. 154(b) by 0 days.

(21) Appl. No.: 12/967,950

(22) Filed: Dec. 14, 2010

(65) Prior Publication Data

US 2011/0309626 A1 Dec. 22, 2011

Related U.S. Application Data

(63) Continuation-in-part of application No. 12/715,928, filed on Mar. 2, 2010, now Pat. No. 7,875,992, and a continuation-in-part of application No. 12/715,969, filed on Mar. 2, 2010, now Pat. No. 7,872,366, and a continuation-in-part of application No. 12/716,015, filed on Mar. 2, 2010, now Pat. No. 7,948,109, said application No. 12/715,928 is a continuation of application No. 12/368,036, filed on Feb. 9, 2009, now Pat. No. 7,821,153.

(51) Int. Cl.
*F03D 9/00* (2006.01)
*H02P 9/04* (2006.01)
*F03B 13/00* (2006.01)

(52) U.S. Cl.
USPC .............................................. 290/55; 290/54

(58) Field of Classification Search .................... 290/54, 290/55
See application file for complete search history.

(56) References Cited

U.S. PATENT DOCUMENTS

| | | | | |
|---|---|---|---|---|
| 1,496,767 A | * | 6/1924 | Bonetto | 415/2.1 |
| 2,501,696 A | * | 3/1950 | Souczek | 290/43 |
| 3,638,385 A | * | 2/1972 | Nobels et al. | 52/665 |
| 3,886,701 A | * | 6/1975 | Bogaert | 52/200 |
| 3,980,894 A | * | 9/1976 | Vary et al. | 290/54 |
| 3,986,787 A | * | 10/1976 | Mouton et al. | 415/7 |
| 4,095,918 A | * | 6/1978 | Mouton et al. | 415/7 |
| 4,122,675 A | * | 10/1978 | Polyak | 327/28 |
| 4,165,704 A | * | 8/1979 | West, Jr. | 114/144 C |
| 4,295,783 A | * | 10/1981 | Lebost | 415/4.4 |
| 4,309,146 A | * | 1/1982 | Hein et al. | 415/4.4 |
| 4,383,182 A | * | 5/1983 | Bowley | 290/43 |
| 4,486,143 A | * | 12/1984 | McVey | 415/164 |
| 4,499,034 A | * | 2/1985 | McAllister, Jr. | 261/109 |
| 4,551,631 A | * | 11/1985 | Trigilio | 290/55 |
| 4,582,013 A | * | 4/1986 | Holland, Jr. | 114/39.3 |
| 4,850,190 A | * | 7/1989 | Pitts | 60/398 |
| 5,332,354 A | * | 7/1994 | Lamont | 415/4.2 |
| 5,394,016 A | * | 2/1995 | Hickey | 290/55 |
| 5,798,572 A | * | 8/1998 | Lehoczky | 290/54 |
| 6,041,596 A | * | 3/2000 | Royer | 60/398 |
| 6,091,161 A | * | 7/2000 | Dehlsen et al. | 290/43 |

(Continued)

*Primary Examiner* — Pedro J Cuevas
(74) *Attorney, Agent, or Firm* — Amster, Rothstein & Ebenstein LLP

(57) ABSTRACT

A system for generating electricity including a building structure and one or more subsystems structurally integrated with the building structure. Each subsystem includes a vertically oriented tower, a scoop mounted on the tower and including an air intake opening and an air outlet opening, and turbine blades disposed within the scoop that are activated by air flow from the air intake opening to the air outlet opening of the scoop. One or more wind turbines are operatively connected to the turbine blades of the one or more subsystems to generate electricity.

18 Claims, 12 Drawing Sheets

U.S. PATENT DOCUMENTS

| | | | | |
|---|---|---|---|---|
| 6,097,104 A * | 8/2000 | Russell | | 290/54 |
| 6,100,600 A * | 8/2000 | Pflanz | | 290/54 |
| 6,104,097 A * | 8/2000 | Lehoczky | | 290/54 |
| 6,172,429 B1 * | 1/2001 | Russell | | 290/54 |
| 6,201,313 B1 * | 3/2001 | Nakamats | | 290/54 |
| 6,531,788 B2 * | 3/2003 | Robson | | 290/43 |
| 6,703,720 B1 * | 3/2004 | Ferraro | | 290/55 |
| 6,717,285 B2 * | 4/2004 | Ferraro | | 290/55 |
| 6,952,058 B2 * | 10/2005 | McCoin | | 290/44 |
| 7,075,189 B2 * | 7/2006 | Heronemus et al. | | 290/44 |
| 7,098,552 B2 * | 8/2006 | McCoin | | 290/44 |
| 7,116,006 B2 * | 10/2006 | McCoin | | 290/54 |
| 7,291,936 B1 * | 11/2007 | Robson | | 290/43 |
| 7,323,791 B2 * | 1/2008 | Jonsson | | 290/55 |
| 7,600,963 B2 * | 10/2009 | Miller | | 415/4.3 |
| 7,728,455 B2 * | 6/2010 | Branco | | 290/55 |
| 7,753,644 B2 * | 7/2010 | Krippene | | 415/4.2 |
| 7,811,048 B2 * | 10/2010 | Allaei | | 415/1 |
| 7,821,153 B2 * | 10/2010 | Gray | | 290/55 |
| D626,658 S * | 11/2010 | Desmarais et al. | | D25/18 |
| 7,872,366 B2 * | 1/2011 | Gray | | 290/55 |
| 7,875,992 B2 * | 1/2011 | Gray | | 290/55 |
| 7,911,075 B2 * | 3/2011 | Pagliasotti | | 290/55 |
| 7,948,109 B2 * | 5/2011 | Gray | | 290/54 |
| 8,134,252 B2 * | 3/2012 | Pagliasotti | | 290/55 |
| 8,232,665 B2 * | 7/2012 | Sato | | 290/55 |
| 8,253,266 B2 * | 8/2012 | Elliott et al. | | 290/55 |
| 2002/0036407 A1 * | 3/2002 | Ferraro | | 290/5 |
| 2002/0040555 A1 * | 4/2002 | Banks et al. | | 52/90.1 |
| 2002/0158472 A1 * | 10/2002 | Robson | | 290/43 |
| 2003/0168864 A1 * | 9/2003 | Heronemus et al. | | 290/55 |
| 2004/0247438 A1 * | 12/2004 | McCoin | | 416/132 B |
| 2005/0082839 A1 * | 4/2005 | McCoin | | 290/55 |
| 2006/0006658 A1 * | 1/2006 | McCoin | | 290/55 |
| 2006/0012182 A1 * | 1/2006 | McCoin | | 290/55 |
| 2007/0018462 A1 * | 1/2007 | Richards et al. | | 290/55 |
| 2007/0041823 A1 * | 2/2007 | Miller | | 415/4.1 |
| 2007/0145160 A1 * | 6/2007 | Martin | | 236/49.3 |
| 2007/0231118 A1 * | 10/2007 | Krippene | | 415/4.2 |
| 2007/0257492 A1 * | 11/2007 | Robson | | 290/54 |
| 2008/0050993 A1 * | 2/2008 | Mackie | | 441/1 |
| 2008/0112789 A1 * | 5/2008 | Kelaiditis | | 415/4.1 |
| 2008/0315592 A1 * | 12/2008 | Branco | | 290/55 |
| 2009/0155043 A1 * | 6/2009 | Krippene | | 415/4.2 |
| 2009/0275279 A1 * | 11/2009 | Holt et al. | | 454/237 |
| 2010/0034656 A1 * | 2/2010 | Miller | | 416/170 R |
| 2010/0084867 A1 * | 4/2010 | Sato | | 290/52 |
| 2010/0133847 A1 * | 6/2010 | Allaei | | 290/55 |
| 2010/0156103 A1 * | 6/2010 | Gray | | 290/50 |
| 2010/0156105 A1 * | 6/2010 | Gray | | 290/52 |
| 2010/0156107 A1 * | 6/2010 | Gray | | 290/55 |
| 2010/0156108 A1 * | 6/2010 | Gray | | 290/55 |
| 2010/0275598 A1 * | 11/2010 | Raffaele et al. | | 60/641.8 |
| 2010/0278629 A1 * | 11/2010 | Krippene | | 415/1 |
| 2011/0133462 A1 * | 6/2011 | Pagliasotti | | 290/50 |
| 2012/0014799 A1 * | 1/2012 | Mewburn-Crook | | 416/178 |
| 2012/0056482 A1 * | 3/2012 | Kaufman | | 307/80 |
| 2012/0187698 A1 * | 7/2012 | Bassett | | 290/55 |

* cited by examiner

US 8,421,265 B2

SYSTEM AND METHOD FOR GENERATING ELECTRICITY WITHIN A BUILDING STRUCTURE

RELATED APPLICATIONS

This application is a continuation-in-part of U.S. patent application Ser. Nos. 12/715,928; 12/715,969; 12/716,015, all of which are entitled System and Method for Generating Electricity, all of which were filed on Mar. 2, 2010, and all of which are continuations of U.S. patent application Ser. No. 12/368,036, entitled System and Method for Generating Electricity, filed Feb. 9, 2009, the contents of which are incorporated herein by reference in their entirety.

FIELD OF THE INVENTION

The present invention relates to systems and method of generating electricity, and in particular relates to systems and methods for generating electricity using air and/or water currents.

SUMMARY OF THE INVENTION

A system for generating electricity according to an exemplary embodiment of the present invention comprises a building structure and one or more subsystems structurally integrated with the building structure. Each subsystem comprises: a vertical oriented tower; a scoop mounted on the tower and comprising an air intake opening and an air outlet opening; and turbine blades disposed within the scoop that are activated by air flow from the air intake opening to the air outlet opening of the scoop. One or more wind turbines are operatively connected to the turbine blades of the one or more subsystems to generate electricity.

In at least one embodiment, the one or more subsystems comprise a plurality of subsystems, and each of the plurality of subsystems are disposed at a different height within the building structure.

In at least one embodiment, the one or more subsystems are disposed within a housing of the building structure, the housing comprising one or more vents that provide the air flow to the one or more subsystems.

In at least one embodiment, the system further comprises an energy storage system operatively connected to the one or more wind turbines.

In at least one embodiment, the energy storage system is selected from the following types of energy storage systems: rechargeable batteries, superconducting magnetic energy storage systems, flywheels, supercapacitors, and pumped hydropower storage systems.

In at least one embodiment, the energy storage system is used to provide energy to the building structure.

In at least one embodiment, the scoop is moveably mounted using one of the following mounting types: ball bearings, wheels, magnetic levitation and gears.

In at least one embodiment, the scoop is adjustable in size to accommodate the air flow.

In at least one embodiment, the scoop comprises an air flow intake screen that filters solid objects.

In at least one embodiment, the tower comprises at least one channel for movement of water condensation away from the tower.

In at least one embodiment, the wind turbine is connected to an electrical power grid.

In at least one embodiment, the system further comprises a flywheel operatively connected to the wind turbine.

In at least one embodiment, the system further comprises an emergency outflow device that releases at least part of the air flow during periods of increased air flow.

In at least one embodiment, the scoop has a shape that is selected from one of the following shape types: conical, cylindrical and spherical.

In at least one embodiment, the system further comprises a platform, and the one or more subsystems are disposed on the platform.

In at least one embodiment, each subsystem comprises a plurality of scoops, each of the plurality of scoops being angled in a different direction so as to capture varying air flows.

BRIEF DESCRIPTION OF THE DRAWINGS

The above and related objects, features and advantages of the present invention will be more fully understood by reference to the following, detailed description of the preferred, albeit illustrative, embodiments of the present invention when taken in conjunction with the accompanying figures, wherein.

DETAILED DESCRIPTION OF THE PREFERRED EMBODIMENT(S)

Figure 1:
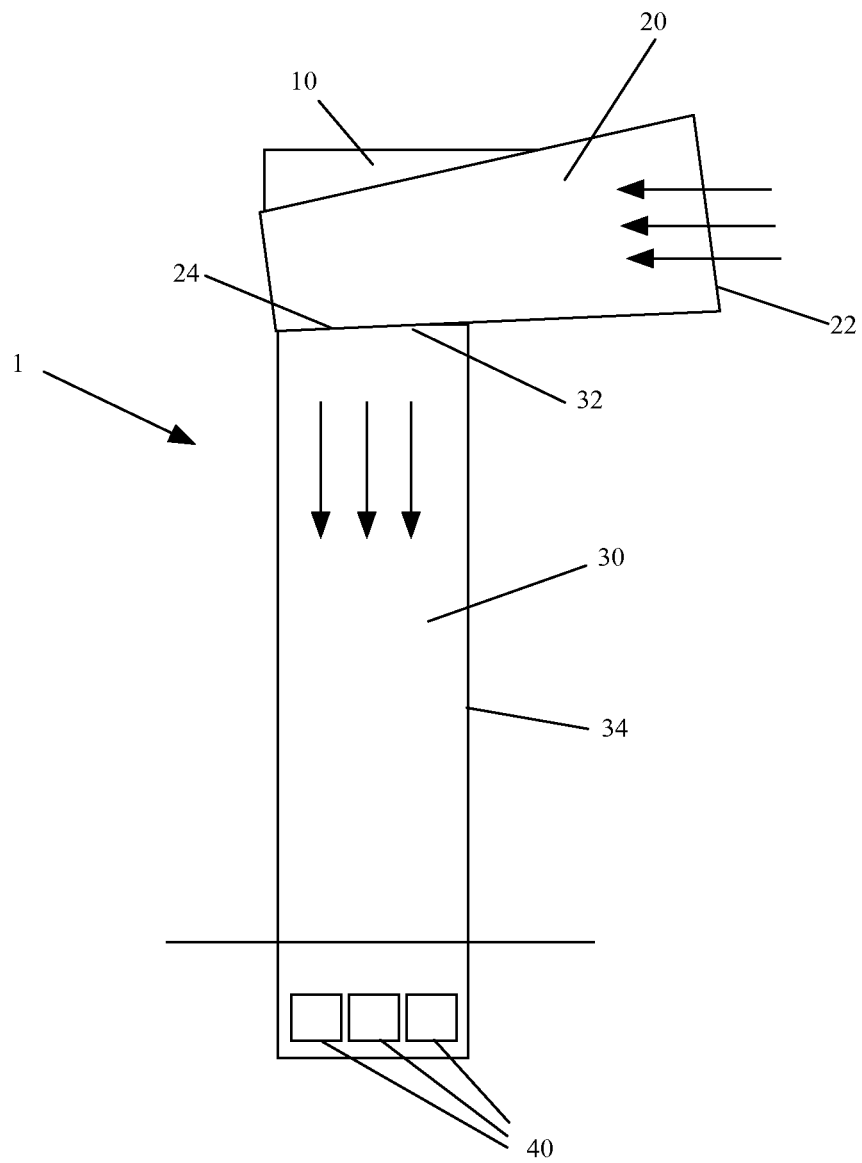
FIG. 1 is a simplified longitudinal cross-section view of a system for generating electricity using fluid currents in accordance with an exemplary embodiment of the present invention.

The present invention is directed to a system and method for generating electricity involving the use of a scoop that actively directs a fluid current through an intake opening towards a turbine. The scoop may be automatically angled so as to maximize its ability to collect the fluid. In various exemplary embodiments of the present invention, the scoop may be capable of collecting air and/or fluid currents. Also, the scoop is preferably mounted on a tower, which provides significant advantages to the overall system, as explained in further detail below.

A system for generating electricity according to an exemplary embodiment of the present invention comprises: a substantially vertical oriented tower comprising an intake opening for receiving air flow; a scoop that is moveably mounted to a base for directing the airflow to the intake opening; a wind vane operatively connected to the scoop so that rotation of the wind vane in response to the air flow angles the scoop in the direction of the airflow; and a wind turbine that receives the airflow directed by the scoop to generate electricity.

In at least one embodiment, the wind turbine is disposed within the tower.

In at least one embodiment, the wind turbine is disposed outside the tower and is operatively connected to the intake opening for processing air flow received by the scoop.

In at least one embodiment, the tower comprises an outflow opening through which the air flow exits to be received by the wind turbine.

In at least one embodiment, the tower is hollow so as to direct the air flow to the wind turbine.

In at least one embodiment, the tower comprises at least one tube that directs the air flow to the wind turbine.

In at least one embodiment, the scoop is moveably mounted using one of the following mounting types: ball bearings, wheels, magnetic levitation and gears.

In at least one embodiment, the scoop is moveably mounted on the tower.

In at least one embodiment, the scoop is mounted separately from the tower.

In at least one embodiment, the scoop is adjustable in size to accommodate the air flow.

In at least one embodiment, the scoop comprises an air flow intake screen that filters solid objects.

In at least one embodiment, the tower comprises at least one channel for movement of water condensation away from the tower.

In at least one embodiment, the wind vane is operatively connected to the scoop using one of the following connecting types: gears, pulleys and motors.

In at least one embodiment, the wind turbine is connected to an electrical power grid.

In at least one embodiment, the system further comprises a flywheel operatively connected to the wind turbine.

In at least one embodiment, the system further comprises an emergency outflow device that releases at least part of the airflow during periods of increased air flow.

In at least one embodiment, the scoop has a shape that is selected from one of the following shape types: conical, cylindrical and spherical.

A system for generating electricity according to an exemplary embodiment of the present invention comprises: a vertical oriented tower comprising an intake opening for receiving fluid flow; a scoop that is moveably mounted to a base for directing the fluid flow to the intake opening; a fluid-activated mechanism that is automatically oriented in response to direction of the fluid flow, the fluid-activated mechanism being operatively connected to the scoop so that orientation of the fluid-activated mechanism in response to the fluid flow angles the scoop in the direction of the fluid flow; and a turbine that receives the fluid flow directed by the scoop to generate electricity.

A system for generating electricity according to an exemplary embodiment of the present invention comprises: a vertical oriented tower comprising an intake opening for receiving fluid flow; a scoop that is moveably mounted to a base for directing the fluid flow to the intake opening; a fluid-activated mechanism that is automatically oriented in response to direction of the fluid flow, the fluid-activated mechanism being operatively connected to the scoop so that orientation of the fluid-activated mechanism in response to the fluid flow angles the scoop in the direction of the fluid flow; and a turbine that receives the fluid flow directed by the scoop to generate electricity, the turbine comprising one or more turbine blades disposed within the scoop and a rotor assembly disposed within the tower.

In at least one embodiment, the fluid is water.

In at least one embodiment, the tower is adapted for flotation in a body of water.

In at least one embodiment, the tower comprises an anchoring mechanism that holds the tower in place within a body of water.

In at least one embodiment, the fluid is air.

A method of generating electricity in accordance with an exemplary embodiment of the present invention comprises the steps of: providing a system comprising: a vertical oriented tower comprising an intake opening; a scoop that is moveably mounted to a base, the scoop being in fluid communication with the intake opening of the tower; a fluid-activated mechanism that is automatically oriented in response to direction of fluid flow, the fluid-activated mechanism being operatively connected to the scoop so that orientation of the fluid-activated mechanism in response to the fluid flow angles the scoop in the direction of the fluid flow; and a turbine that receives the fluid flow directed by the scoop to generate electricity; and orienting the fluid-activated mechanism in response to the fluid flow; angling the scoop based on the oriented fluid-activated mechanism so that the fluid flows into the scoop; directing the fluid through the scoop into the intake opening of the tower; and directing the fluid through the tower towards the turbine for generation of electricity.

FIG. 1 is a simplified longitudinal cross-sectional view of a system for generating electricity, generally designated by reference number 1, according to an exemplary embodiment of the present invention. The system 1 includes a fluid-activated mechanism 10, a scoop 20 operatively connected to the fluid-activated mechanism 10, a tower 30 on which the scoop is rotatably mounted, and one or more turbines 40. The structure of the system 1 may be generally made from metal, wood, plastic or fabric of either clear, transparent or opaque construction as is best suited for the environment in which the system 1 is installed. Also, various stiffening structures may be employed, where appropriate or required. Although the system 1 may be employed on the ground, the system 1 may also be installed on top of a building structure.

The fluid-activated mechanism 10 may be, for example, a wind vane in the case in which the system 1 is intended for operation using air currents. Alternatively, in the case in which the system 10 is intended for operation within a body of water, the fluid-activated mechanism 10 may be structured so as to change direction depending on the direction of the water current or tides within the body of water. In still other exemplary embodiments, the fluid-activated mechanism 10 may include a sensor that detects the direction of air or water flow, and generates appropriate signals based on the detected flow direction for appropriate angling of the scoop 20. In various exemplary embodiments of the present invention, the fluid-activated mechanism 10 may be an electromechanical device, such as, for example, an electronic sensor or a time-activated mechanism, or a mechanical device, such as, for example, a wind vane or current-following mechanism.

The scoop 20 may include an opening 22 for intake of fluid flow and a mount portion 24 for rotatable attachment to the tower 30. The mount portion 24 may be in fluid communication with the tower 30 so as to allow fluid to flow from the scoop 20 into the tower 30. The scoop 20 may be generally frustoconical in shape, with the diameter of the scoop 20 decreasing as it approaches the mount portion 24. However, it should be appreciated that the scoop 20 is not limited to this shape, and the scoop 20 may have any suitable shape or design to maximize fluid current sensitivity, such as, for example, a cylindrical shape or a spherical shape. In general, the overall shape of the scoop 20, and the opening 22 in particular, is intended to result in compression of the fluid current, which in turn accelerates the fluid through the scoop 20 as it approaches the tower 30. The scoop 20 is preferably rotatably mounted on the tower by any suitable mechanism, such as, for example, ball-bearings, wheels, magnetic levitation or gears, to name a few. The scoop 20 may be mounted so as to have the ability to tilt vertically so as to adjust to fluid currents. The scoop 20 may also be mounted on a base separately from and adjacent to the tower 30. The rotatable mounting of the scoop 20 allows the scoop 20 to rotate with the fluid-activated mechanism 10. In this regard, the scoop 20 may be operatively connected to the fluid-activated mechanism 10 through any suitable connection mechanism, such as, for example, gears, pulleys or motors, to name a few. The scoop 20 may be made of any suitable material, including flexible materials such as plastic, metallic or fabric materials, or more rigid materials such as ceramic.

The scoop 20 may include safety features, such as, for example, lights or reflectors which would increase visibility to avoid collision with aircraft or birds. Other safety features may include netting or an airflow intake screen to prevent animals and other objects from entering and causing damage to the turbines 40. In various exemplary embodiments, the scoop 20 may be retractable and/or removable to avoid damage in harsh weather conditions.

The tower 30 is preferably a substantially vertically-extending structure and includes an intake opening 32 and a fixed support base 34. The support base 34 may be a hollow structure, or alternatively, as shown in the exemplary embodiment of FIG. 2, may include one or more fluid flow tubes 50. Fluid current from the scoop 20 enters the intake opening 32 and travels downwards through the support base 34. The tower 30 may have a height within the range of approximately 20 feet to approximately 3,000 feet, although the height of the tower 30 is not limited to being within this range. The tower 30 may be anchored to ground, and further may extend at least partially below the ground for improved stability. In this regard, the tower 30 may extend into the ground to a depth which may depend on anticipated wind speed, the weight of the structure being supported by the tower 30, and the strength and stability of the ground in which the tower 30 is anchored.

Figure 2:
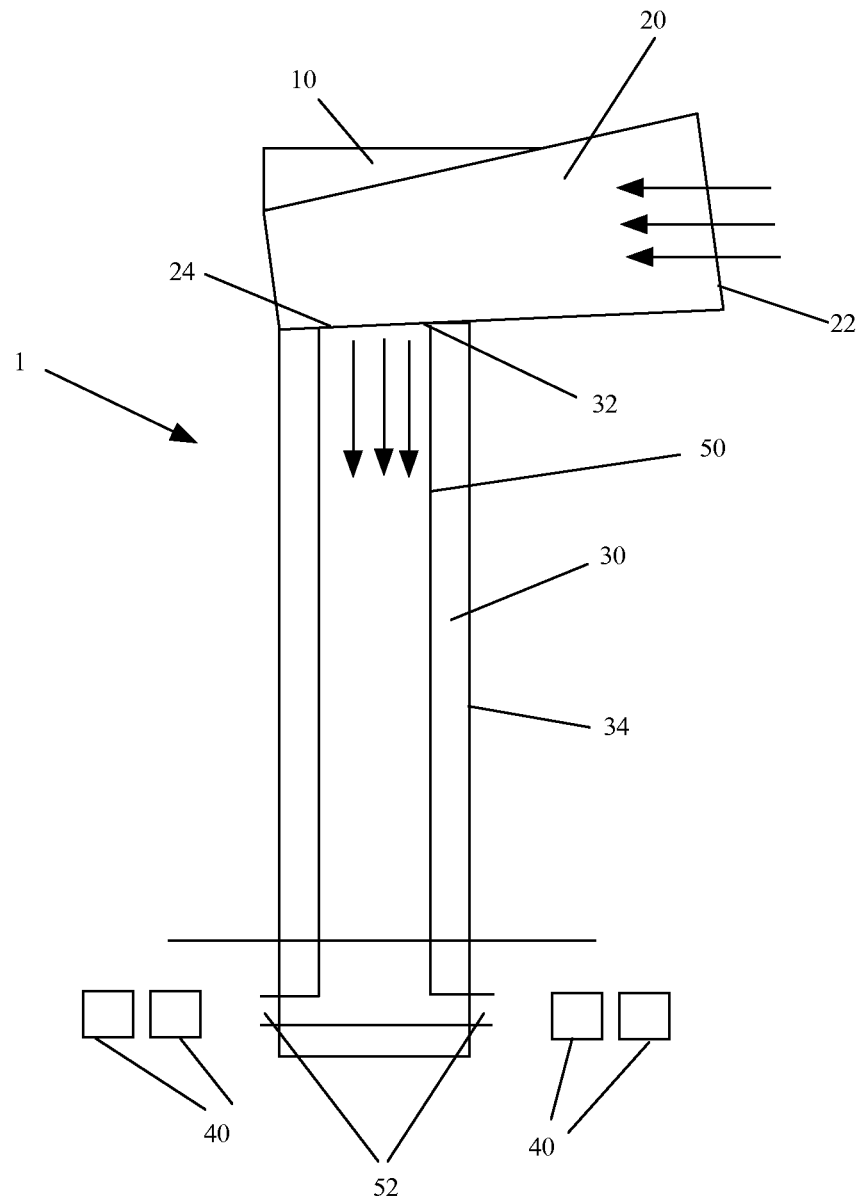
FIG. 2 is a simplified longitudinal cross-section view of a system for generating electricity using fluid currents in accordance with an exemplary embodiment of the present invention.

The one or more turbines 40 are disposed so as to receive the fluid current flowing through the tower 30. Although FIG. 1 shows the turbines 40 located at the base of the tower 30, it should be appreciated that some or all of the turbines 40 may be located at any location within the tower or may be located remotely from the tower 30, in which case the fluid current may exit the tower 30 and be directed to the turbines 40, as needed. In this regard, as shown in FIG. 2, the tower 30 may include outflow opening 52 through which the air flow exits to be received by the turbines 40. Further, the turbines 40 may receive fluid current from more than one tower 30 in the case in which the system 1 is made up of a plurality of such towers 30. Further, the tower 30 functions to reduce the turbulence of the air current before the air current reaches the turbines. In this regard, the tower 30 may include directional slats that co-mingle the airflow to improve stability. In another exemplary embodiment of the invention, the scoop 20 may be adjustable in size, so as that air current speed through the tower 30 may be increased or reduced to maintain turbine stability. Such adjustment in size may be made possible through the use of mechanical, electrical or hydraulic mechanisms, such as, for example, a draw-string type mechanism that is able to adjust the circumference of the scoop 20. In another exemplary embodiment of the invention, the height of tower 30 may be adjustable using any suitable mechanical or electrical mechanisms, such as, for example, a hydraulic system. Such adjustment results in the ability to control the intake speed of the fluid current. This feature may also be combined with an adjustable scoop 20 to provide even further flexibility in fluid current control.

In exemplary embodiments of the invention, the one or more turbines 40 may be operatively associated with one or more energy storage systems, such as, for example, rechargeable batteries, superconducting magnetic energy storage systems, flywheels, supercapacitors, and pumped hydropower storage systems.

Figure 3:
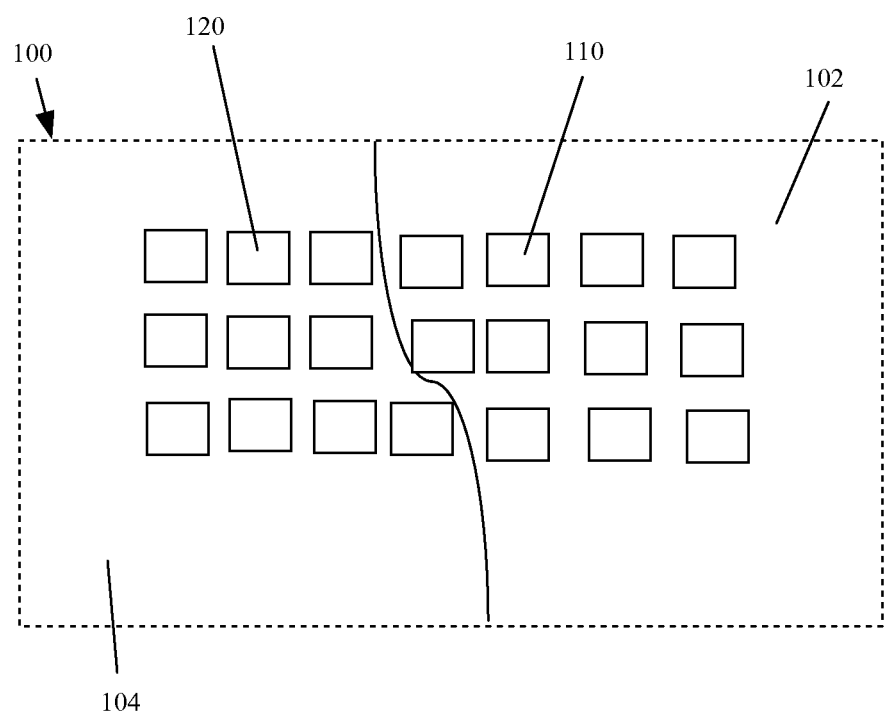
FIG. 3 is a plan view of a system for generating electricity using both air and water currents in accordance with an exemplary embodiment of the present invention.

In an exemplary embodiment of the present invention, the system may be disposed in a geographical location so that both air and water currents may be used. Thus, when there is no or little air current, electricity may still be generated using water currents. Likewise, when there is no or little water currents, electricity may be generated using the air currents. In this regard, FIG. 3 is a plan view of a system for generating electricity, generally designated by reference number 100, using both air and water currents. The system 100 is disposed partially on land 102 and partially within a body of water 104. The part of the system 100 on land 102 may include a plurality of first electricity generating systems 110 and the part of the system 100 within the body of water 104 may include a plurality of second electricity generating systems 120. The first and second electricity generating systems 110, 120 may have the same structure as previously described, including the scoop and tower elements. However, the first electricity generating systems 110 may be adapted for use on land and the second electricity generating systems 120 may be adapted for use within water. For example, the first electricity generating systems 110 may include one or more air turbines, while the second electricity generating systems 120 may include one or more hydrogenerators.

Figure 4:
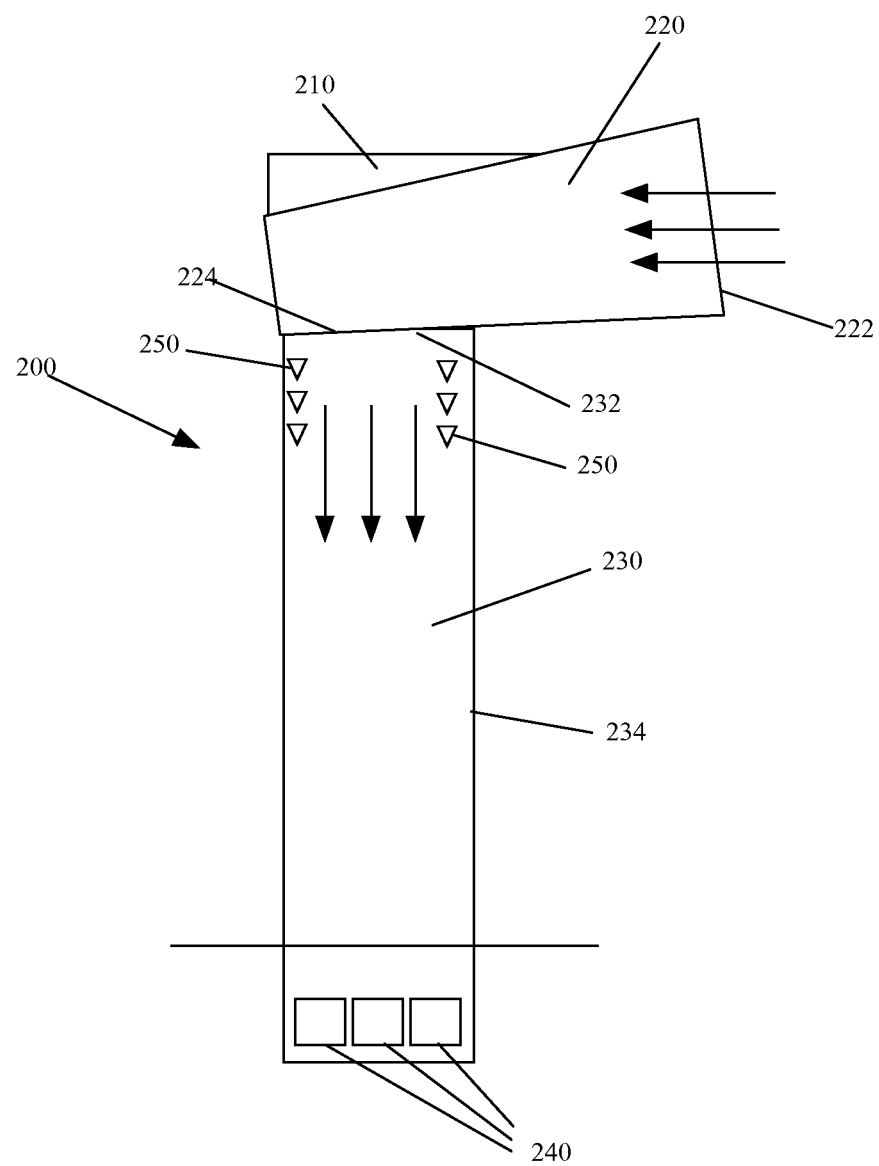
FIG. 4 is a simplified longitudinal cross-section view of a system for generating electricity using fluid currents in accordance with an exemplary embodiment of the present invention.

In other exemplary embodiments of the present invention, air current through the tower may be intensified by using a forced convection mechanism, as disclosed in U.S. Pat. No. 3,894,393, the contents of which are incorporated herein by reference in their entirety. In this regard, FIG. 4 is a simplified longitudinal cross-sectional view of a system for generating electricity, generally designated by reference number 200, according to an exemplary embodiment of the present invention. As in the previous embodiments, the system 200 includes a fluid-activated mechanism 210, a scoop 220 operatively connected to the fluid-activated mechanism 210, a tower 230 on which the scoop is rotatably mounted, and one or more turbines 240. In the present embodiment, water sprayers 250 are disposed at the upper portion of the tower 230. The water source may be from a nearby lake or other body of water. As the water is evaporated, the air at the top of the tower 230 is cooled and made denser relative to the surrounding air, resulting in convection flow of air downwards towards the turbines 240. The convection flow supplements the naturally occurring air currents entering the tower 230 through the scoop 220. In exemplary embodiment of the present invention, the water sprayed into the tower 230 may be used to absorb air pollutants, as described in U.S. Pat. No. 5,395,590, the contents of which are incorporated herein by reference in their entirety. In this regard, catch basins (not shown) may be disposed at the base of the tower 230 for collection of water droplets which have absorbed pollutants. The cleaner and cooler air may be output at the base of the tower 230, so that the polluted warmer air will be displaced upwards and enter the scoop 220 for cleaning and for use to generate electricity within the turbines 240.

Figure 5:
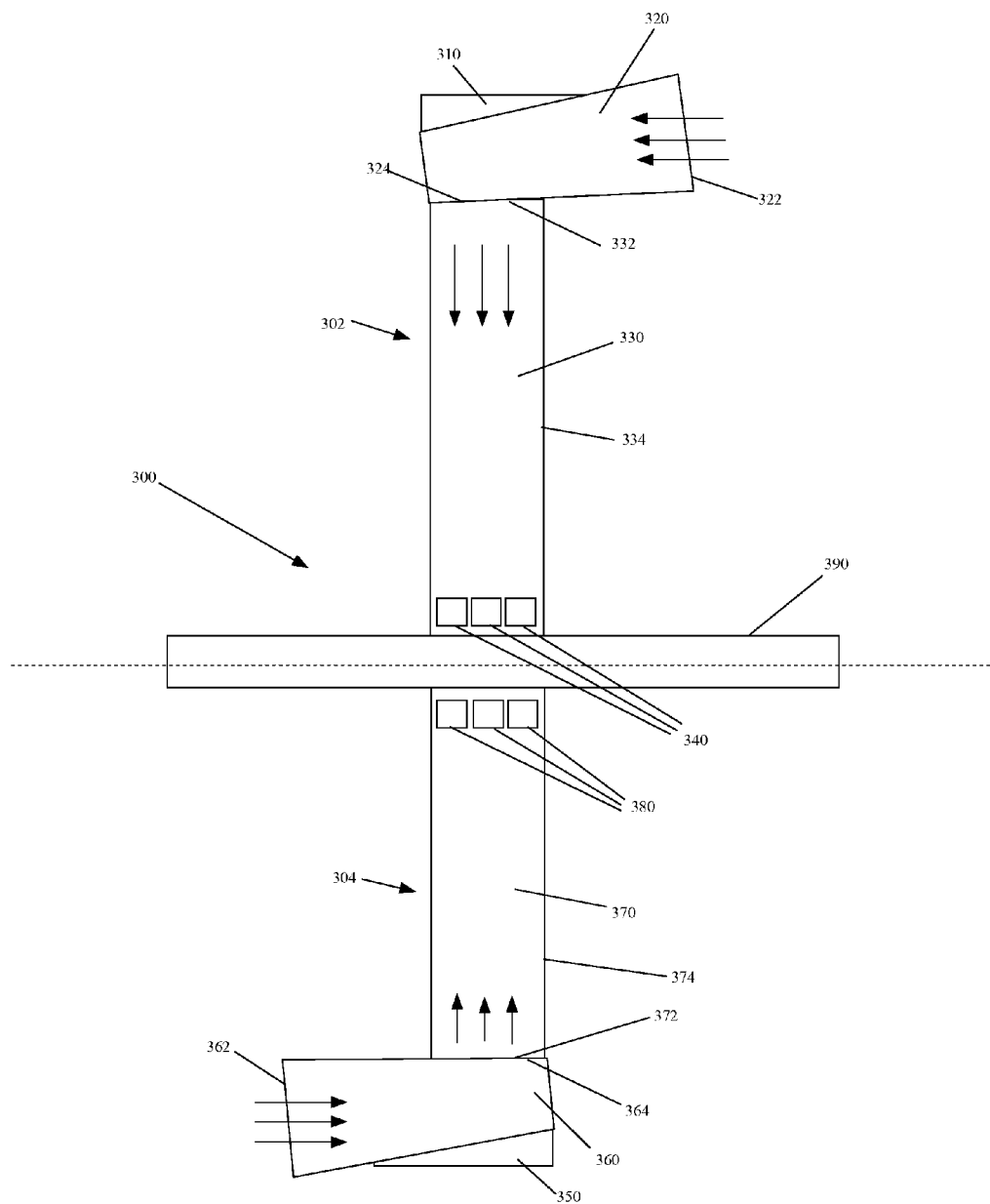
FIG. 5 is a simplified longitudinal cross-section view of a system for generating electricity using fluid currents in accordance with an exemplary embodiment of the present invention.

FIG. 5 a simplified longitudinal cross-sectional view of a system for generating electricity, generally designated by reference number 300, according to an exemplary embodiment of the present invention. The system 300 includes a first subsystem, generally designated by reference number 302, and a second subsystem, generally designated by reference number 304. First subsystem 302 is adapted for functioning in atmosphere, while second subsystem is adapted for functioning within a body of water, such as, for example, a lake, an ocean or a river. As explained in further detail below, the first and second subsystems 302, 304 are mounted to a platform 390. The platform 390 is preferably buoyant, so as to support the first subsystem 302 above the body of water while allowing the second subsystem 304 to project downwards into the body of water. The platform 390 may be freely floating within the body of water, or be anchored to, for example, land adjacent to the body of water or earth below the body of water. Also, the platform 390 may support any number of systems adapted for functioning within air or water. In this regard, the platform 390 may support an array of first subsystems 302 and an array of second subsystems 304.

As in previous embodiments, the first subsystem 302 includes a fluid-activated mechanism 310, a scoop 320 operatively connected to the fluid-activated mechanism 310, a tower 330 on which the scoop is 320 rotatably mounted, and one or more air turbines 340. The scoop 320 may include an opening 322 and a mount portion 324. The tower 330 may include an intake opening 332 and a support base 334. As previously described, air may enter the scoop 320 and flow downwards through the tower 330 to the air turbines 340 to generate electricity.

Also, as in previous embodiments, the second subsystem 304 includes a fluid-activated mechanism 350, a scoop 360 operatively connected to the fluid-activated mechanism 350, a tower 370 on which the scoop is 360 rotatably mounted, and one or more hydrogenerators 380. The scoop 360 may include an opening 362 and a mount portion 364. The tower 370 may include an intake opening 372 and a support base 374. As previously described, water may enter the scoop 360 and flow downwards through the tower 370 to the hydrogenerators 380 to generate electricity.

Figure 6:
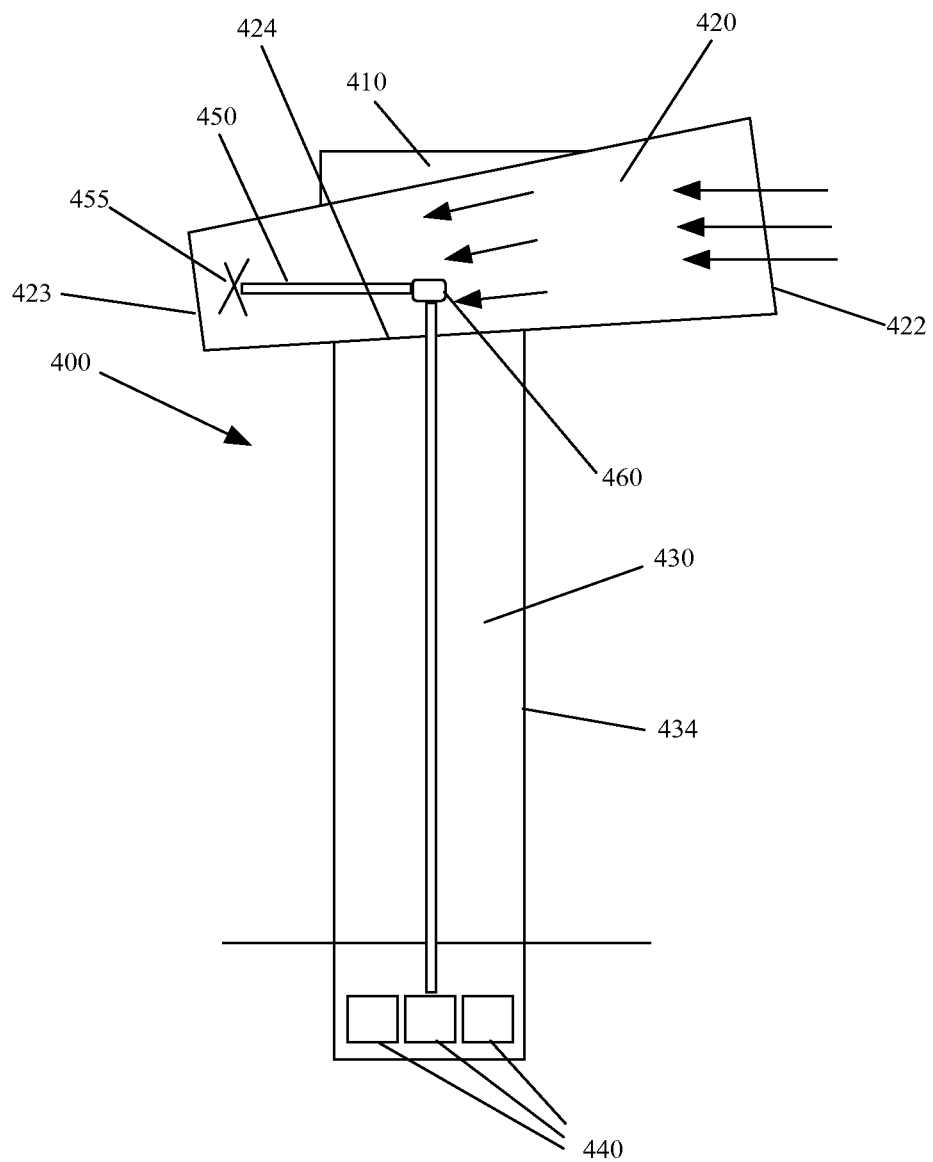
FIG. 6 is a simplified longitudinal cross-section view of a system for generating electricity using fluid currents in accordance with an exemplary embodiment of the present invention.

FIG. 6 a simplified longitudinal cross-sectional view of a system for generating electricity, generally designated by reference number 400, according to an exemplary embodiment of the present invention. As in previous embodiments, the system 400 includes a fluid-activated mechanism 410, a scoop 420 operatively connected to the fluid-activated mechanism 410, a tower 430 on which the scoop 420 is rotatably mounted, and one or more turbines 440. The scoop 420 may include a mount portion 424, an intake opening 422 at the larger diameter end of the scoop 420 and a fluid outlet opening 423 at the smaller diameter end of the scoop 420. The tower 430 may include a support base 434.

In the present embodiment, turbine blades 455 of at least one of the fluid turbines 440 may be separated out and disposed at a remote location. For example, as shown in FIG. 6, the turbine blades 455 may be disposed within the scoop 420. Thus, unlike previous embodiments, fluid current collected by the scoop 420 does not travel downwards into the tower 430, but is instead constricted and directed within the scoop 420 towards the turbine blades 455. In this regard, the turbine blades 455 are preferably located in close proximity to the fluid outlet opening 423 of the scoop 420. A shaft 450 may be operatively connected between the turbine blades 455 and corresponding rotor assemblies of one or more of the turbines 440 through, for example, a reduction gear system 460. The shaft 450 may be made up of two or more shafts connected together by hubs, for example. The one or more turbines 440 may be located within the tower 430, either at the base or at any location between the base and the top of the tower 430.

Figure 7A:
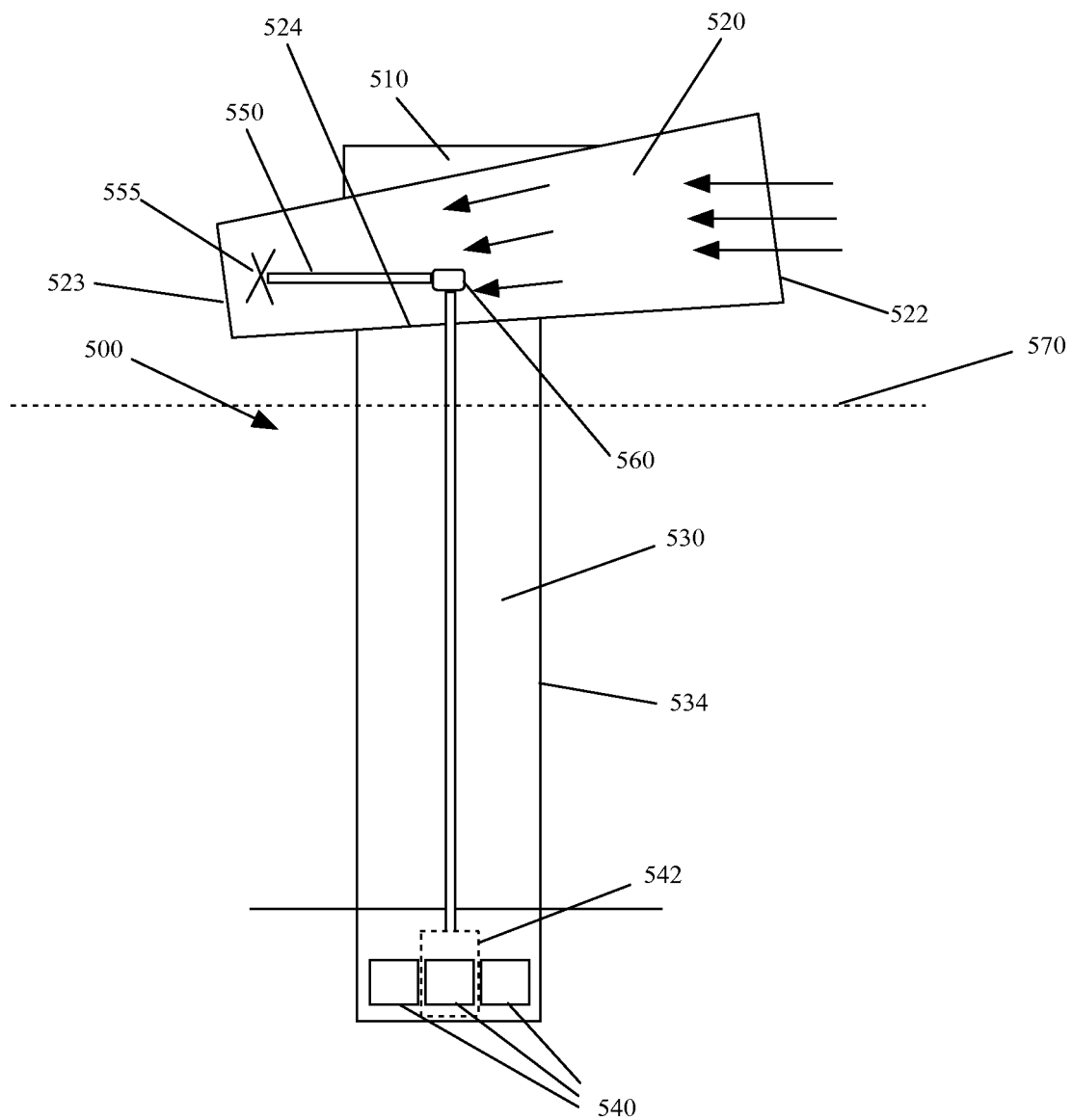
FIG. 7A is a simplified longitudinal cross-section view of a system for generating electricity using fluid currents in accordance with an exemplary embodiment of the present invention as shown with the water level below the height of the scoop.
Figure 7B:
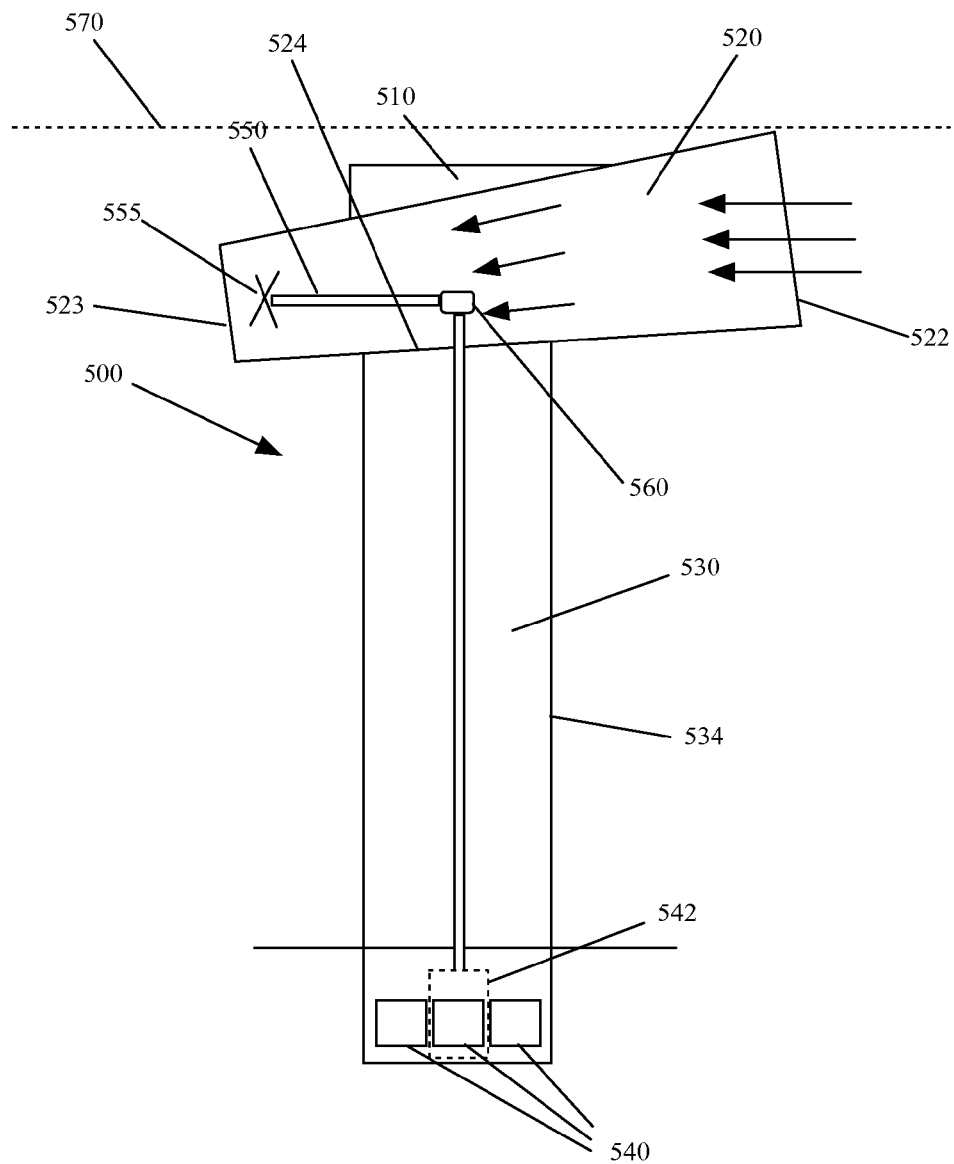
FIG. 7B is a simplified longitudinal cross-section view of a system for generating electricity using fluid currents in accordance with an exemplary embodiment of the present invention as shown with the water level above the height of the scoop.

FIGS. 7A and 7B are simplified longitudinal cross-sectional views of a system for generating electricity, generally designated by reference number 500, according to an exemplary embodiment of the present invention. As in the previous embodiment, the system 500 includes a fluid-activated mechanism 510, a scoop 520 operatively connected to the fluid-activated mechanism 510, a tower 530 on which the scoop 520 is rotatably mounted, and one or more turbines 540. The scoop 520 may include a mount portion 524, an intake opening 522 at the larger diameter end of the scoop 520 and a fluid outlet opening 523 at the smaller diameter end of the scoop 520. The tower 530 may include a support base 534. Also, as in the previous embodiment, a set of turbine blades 555 may be disposed within the scoop 520 and be connected to the turbines 540 through a shaft 550 and a reduction gear system 560.

In the present embodiment, the system 500 is adapted so as to be capable of generating electricity using either air or water. In this regard, one or more of the turbines 540 may be an air turbine disposed within a water-proof chamber 542. The remaining turbines 540 may be hydrogenerators. Alternatively, each turbine 540 may be capable of generating electricity using either air or water based on the kinetic energy captured by the turbine blades 555 located within the scoop 520. In other exemplary embodiments, the system 500 may include a control system that selectively operate air turbines and hydrogenerators based on a sensor mechanism that detects whether the scoop 520 is exposed to water or air. In FIG. 7A, the system 500 is shown with the scoop 520 capturing air currents, such as when the water level 570 is below the elevation of the scoop 520. This may occur when the body of water in which the system 500 is located is at low tide, for example. In FIG. 7B, the system 500 is shown with the scoop 520 capturing water currents, such as when the water level 570 is above the elevation of the scoop 520. This may occur when the body of water in which the system 500 is located is at high tide, for example.

Figure 8:
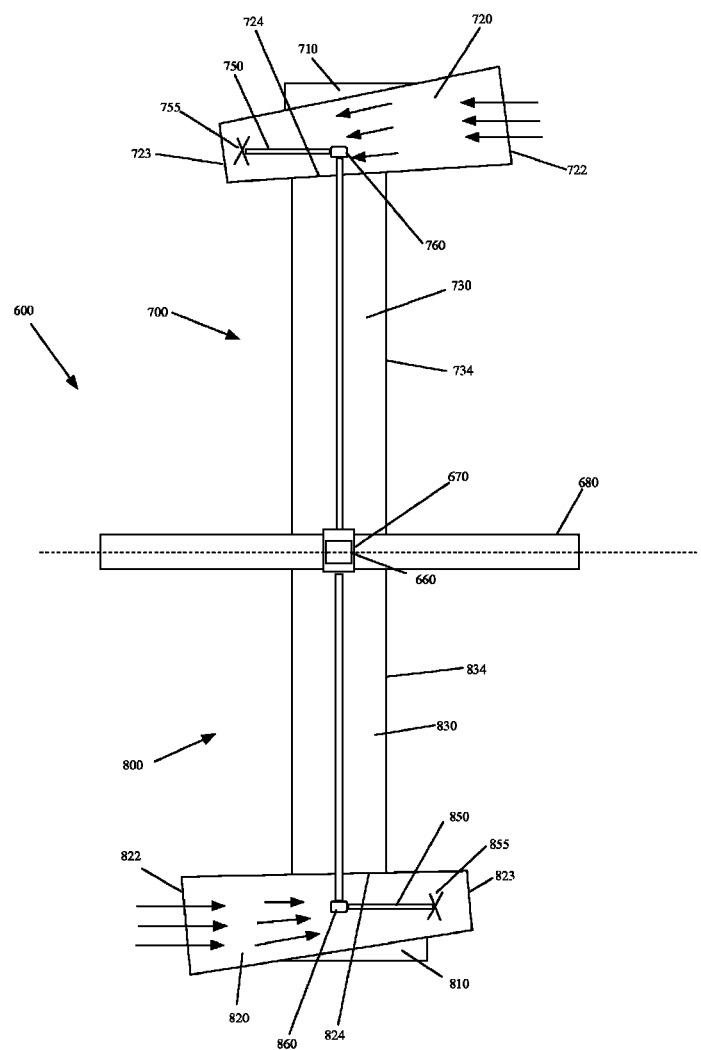
FIG. 8 is a simplified longitudinal cross-section view of a system for generating electricity using fluid currents in accordance with an exemplary embodiment of the present invention.

FIG. 8 a simplified longitudinal cross-sectional view of a system for generating electricity, generally designated by reference number 600, according to an exemplary embodiment of the present invention. The system 600 includes a first subsystem, generally designated by reference number 700, and a second subsystem, generally designated by reference number 800. First subsystem 700 is adapted for functioning in atmosphere, while second subsystem 800 is adapted for functioning within a body of water, such as, for example, a lake, an ocean or a river. As explained in further detail below, the first and second subsystems 700, 800 are mounted to a platform 680. The platform 680 is preferably buoyant, so as to support the first subsystem 700 above the body of water while allowing the second subsystem 800 to project downwards into the body of water. The platform 680 may be freely floating within the body of water, or be anchored to, for example, land adjacent to the body of water or earth below the body of water. Also, the platform 680 may support any number of electricity generating systems adapted for functioning within air or water. In this regard, the platform 680 may support an array of first subsystems 700 and an array of second subsystems 800.

As in previous embodiments, the subsystem 700 includes a fluid-activated mechanism 710, a scoop 720 operatively connected to the fluid-activated mechanism 710, and a tower 730 on which the scoop 720 is rotatably mounted. The scoop 720 may include a mount portion 724, an intake opening 722 at the larger diameter end of the scoop 720 and a fluid outlet opening 723 at the smaller diameter end of the scoop 720. The tower 730 may include a support base 734. Also, as in previous embodiment, a set of turbine blades 755 may be disposed within the scoop 720. The turbine blades 755 may be operatively connected to a turbine 660 through a shaft 750 and a reduction gear system 760. The turbine 660 may be disposed within a water-proof housing 670.

Also, as in previous embodiments, the subsystem 800 includes a fluid-activated mechanism 810, a scoop 820 operatively connected to the fluid-activated mechanism 810, and a tower 830 on which the scoop 820 is rotatably mounted. The scoop 820 may include a mount portion 824, an intake opening 822 at the larger diameter end of the scoop 820 and a fluid outlet opening 823 at the smaller diameter end of the scoop 820. The tower 830 may include a support base 834. Also, as in previous embodiment, a set of turbine blades 855 may be disposed within the scoop 820. The turbine blades 855 may be operatively connected to the turbine 660 through a shaft 850 and a reduction gear system 860. The turbine 660 may be disposed within the tower 730, the tower 830 or within the platform 680.

With the structure as described above, the system 600 is able to generate electricity using both air and water currents, resulting in a more steady and efficient flow of electricity. In this regard, there are less gaps in electricity generation, since there will almost always either be an air or water current to activate the turbine blades within their respective scoops.

Figure 9:
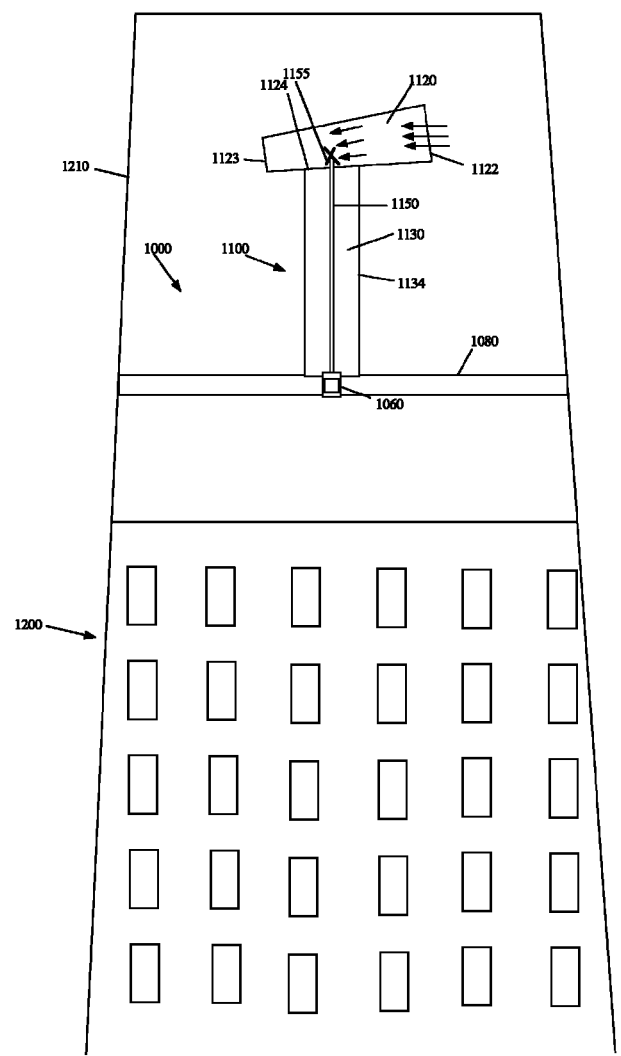
FIG. 9 is a simplified longitudinal cross-sectional view of an energy-efficient building structure according to an exemplary embodiment of the present invention.

FIG. 9 is a simplified longitudinal cross-sectional view of an energy-efficient building structure, generally designated by reference number 1200, according to an exemplary embodiment of the present invention. The energy-efficient building structure 1200 may be made up of a building 1210 on which is mounted a system for generating electricity 1000. The building 1210 may be, for example, a mid rise or high rise building, and may be either a commercial, industrial or residential building or a combination thereof. The system 1000 includes a subsystem, generally designated by reference number 1100. Although only one subsystem 1100 is shown in FIG. 9, it should be appreciated that any number of subsystems 110 may be integrated within the building 1210. In this regard, a number of subsystems 1100 may be provided with each subsystem 1100 angled to face a different direction so that the system 1000 has the ability to capture varying air flows. The subsystem 1100 may be adapted for functioning in atmosphere.

As explained in further detail below, the subsystem 1100 may be mounted to a platform 1080. The platform 1080 may in turn be mounted to the building 1310 within, for example, a rooftop housing having a number of openings that allows for entry of air into the subsystem 1100. It should be appreciated that the subsystem 1100 may be located at any height within the building structure 1210. For example, the subsystem 1100 may be located closer to ground height, so as to take advantage of high wind speeds produced by air flow between adjacent buildings within a city. The subsystem 1100 may also be disposed higher up within the building structure 1210 so as to be exposed to high altitude wind speeds. The platform 1080 may support any number of subsystems 1100. In this regard, the platform 1080 may support an array of subsystems 1100, which each subsystem 1100 angled in a different direction.

As in previous embodiments, the subsystem 1100 include a scoop 1120 and a tower 1130 on which the scoop 1120 may be fixed or rotatably mounted. Although only one scoop 1120 is shown in FIG. 9, it should be appreciated that any number of scoops 1120 may be provided. In this regard, a plurality of scoops 1120 may be mounted to the tower 1130, with each scoop 1120 angled to face a different direction so as to capture varying air flows. The scoop 1120 may include a mount portion 1124, air intake openings 1122 at the larger diameter end of the scoop 1120 and air outlet opening 1123 at the smaller diameter ends of the scoop 1120. The tower 1130 may include a support base 1134. Also, as in previous embodiments, a set of turbine blades 1155 may be disposed within the scoop 1120. The turbine blades 1155 may be operatively connected to a turbine 1060 through shafts 1150. The turbine 1060 may be disposed within the tower 1130 or within the platform 1080. The turbine 1060 may generate electricity used to power an electrical network within the building 1410 and/or an electrical power grid.

Figure 10:
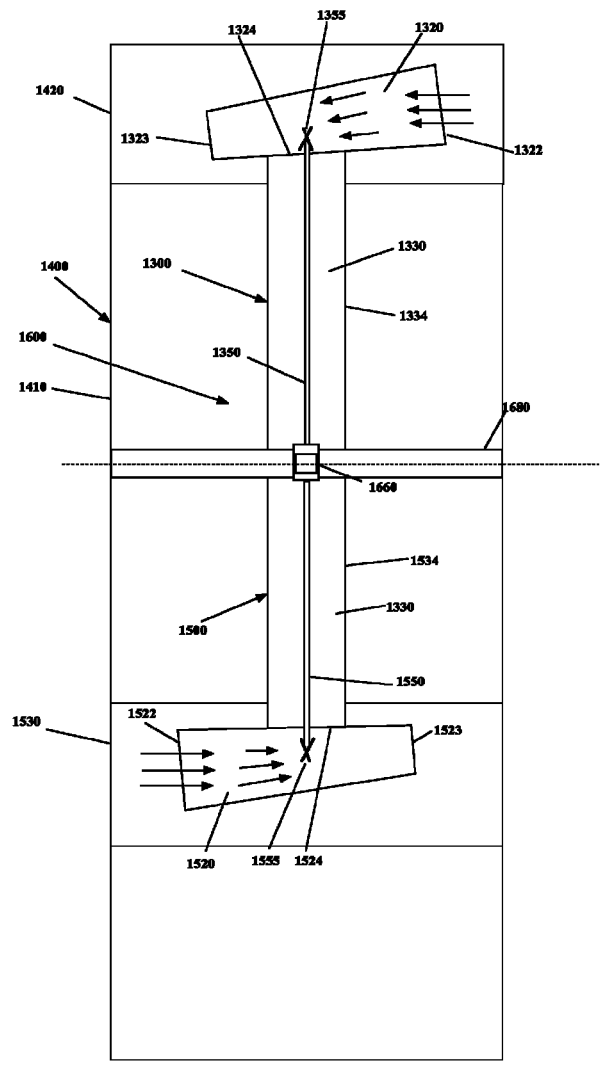
FIG. 10 is a simplified longitudinal cross-sectional view of an energy-efficient building structure according to another exemplary embodiment of the present invention.

FIG. 10 is a simplified longitudinal cross-sectional view of an energy-efficient building structure, generally designated by reference number 1400, according to another exemplary embodiment of the present invention. The energy-efficient building structure 1400 may be made up of a building 1410 within which is integrated a system for generating electricity, generally designed by reference number 1600. The building 1410 may be, for example, a mid rise or high rise building, and may be either a commercial, industrial or residential building or a combination thereof. The system 1600 includes a first subsystem, generally designated by reference number 1300, and a second subsystem, generally designated by reference number 1500. Both the first and second subsystems 1300, 1500 may be adapted for functioning in atmosphere. As explained in further detail below, the first subsystem 1300 may be disposed at a height within the building 1410 that is different from a height at which the second subsystem 1500 is disposed. In this regard, the first and second subsystems 1300, 1500 may be mounted to a platform 1680. The platform 1680 may in turn be mounted to the infrastructure of the building 1410. The platform 1680 may support any number of first and second subsystems 1300, 1500. In this regard, a number of first and second subsystems 1300, 1500 may be provided with each first and second subsystem 1300, 1500 angled to face a different direction so that the system 1600 has the ability to capture varying air flows. The platform 1680 may support an array of first subsystems 1300 and an array of second subsystems 1500.

Figure 11:
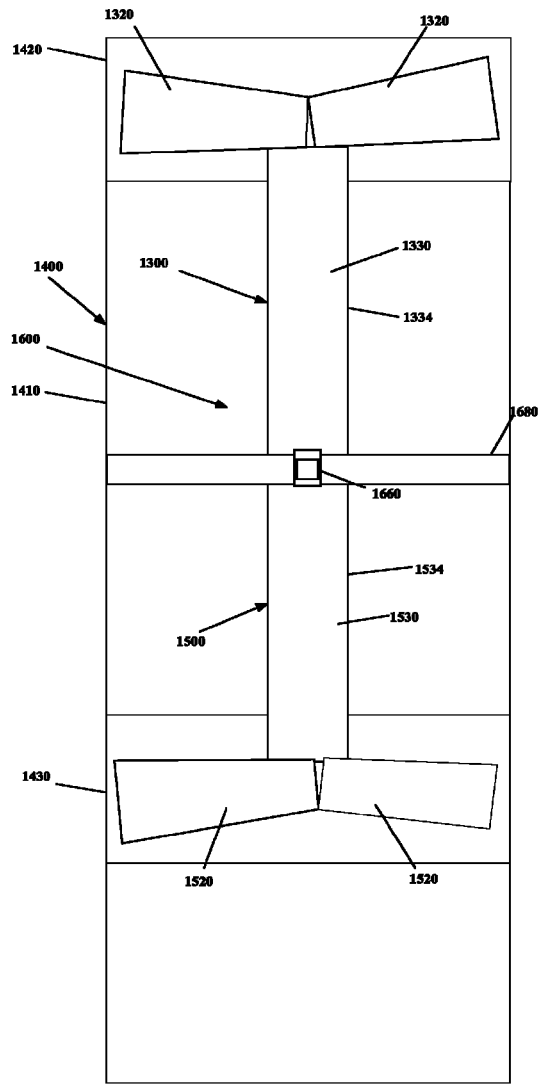
FIG. 11 is a simplified longitudinal cross-sectional view of an energy-efficient building structure according to another exemplary embodiment of the present invention.

As in previous embodiments, the subsystems 1300, 1500 include scoops 1320, 1520 and towers 1330, 1530 on which the scoops 1320, 1520 are fixed or rotatably mounted. Although only one scoop 1320, 1520 is shown in FIG. 10, it should be appreciated that any number of scoops 1320, 1520 may be provided. In this regard, as shown in FIG. 11, a plurality of scoops 1320, 1520 may be mounted to the towers 1330, 1520, with each scoop 1320, 1520 angled to face a different direction so as to capture varying air flows. The scoops 1320, 1520 may include a mount portion 1324, 1524, air intake openings 1322, 1522 at the larger diameter end of the scoops 1320, 1520 and air outlet openings 1323, 1523 at the smaller diameter ends of the scoops 1320, 1520. As shown in FIG. 10, the scoop 1320 of the first subsystem 1300 may be disposed at a first building level 1420, while the scoop 1520 of the second subsystem 1500 may be disposed at a second building level 1430. The first building level 1420 may be at a higher altitude than the second building level 1430. For example, the first building level 1420 may be at roof level, so that the first subsystem 1300 may take advantage of high altitude wind speeds, while the second building level 1430 may be closer to the ground, so that the second subsystem 1500 may take advantage of high wind speeds produced by air flowing between buildings at street level. Although FIG. 10 shows two subsystems disposed at different heights within the building 1410, it should be appreciated that the system 1600 may include any number of subsystems, which each subsystem disposed at a different building level.

The towers 1330, 1530 may include a support base 1334, 1534. Also, as in previous embodiments, a set of turbine blades 1355, 1555 may be disposed within the scoops 1320, 1520. The turbine blades 1355, 1555 may be operatively connected to a turbine 1660 through shafts 1350, 1550. The turbine 1660 may be disposed within the tower 1330, the tower 1530 or within the platform 1680. The turbine 1660 may generate electricity used to power an electrical network within the building 1410 and/or an electrical power grid.

In various exemplary embodiments of the present invention, the system for generating electricity integrated within a building structure may be used in cooperation with other energy efficient systems, such as, for example, solar power systems, hydro power systems, and biomass systems. In general, the systems according to various exemplary embodiments of the present invention may be integrated into a green building so as to minimize the environmental footprint of the overall building structure.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A system for generating electricity, comprising:
a building structure, the building structure being at least one of a commercial or residential building structure;
a plurality of independent subsystems structurally integrated within the building structure, at least one of the plurality of independent subsystems integrated within the building structure at ground height, each subsystem comprising:
a vertical oriented tower;
a scoop mounted on the tower and comprising an air intake opening and an air outlet opening; and
turbine blades disposed within the scoop that are activated by air flow from the air intake opening to the air outlet opening of the scoop; and
one or more wind turbines that are operatively connected to the turbine blades of the one or more subsystems to generate electricity.

2. The system of claim 1, wherein each of the plurality of subsystems are disposed at a different height within the building structure.

3. The system of claim 1, wherein the plurality of independent subsystems are disposed within a housing of the building structure, the housing comprising one or more vents that provide the air flow to the one or more subsystems.

4. The system of claim 1, further comprising an energy storage system operatively connected to the one or more wind turbines.

5. The system of claim 4, wherein the energy storage system is selected from the following types of energy storage systems: rechargeable batteries, superconducting magnetic energy storage systems, flywheels, supercapacitors, and pumped hydropower storage systems.

6. The system of claim 4, wherein the energy storage system stores electrical energy for use by the building structure.

7. The system of claim 1, wherein the scoop is moveably mounted using one of the following mounting types: ball bearings, wheels, magnetic levitation and gears.

8. The system of claim 1, wherein the scoop is adjustable in size to accommodate the air flow.

9. The system of claim 1, wherein the scoop comprises an air flow intake screen that filters solid objects.

10. The system of claim 1, wherein the tower comprises at least one channel for movement of water condensation away from the tower.

11. The system of claim 1, wherein the wind turbine is connected to an electrical power grid.

12. The system of claim 1, further comprising a flywheel operatively connected to the wind turbine.

13. The system of claim 1, further comprising an emergency outflow device that releases at least part of the air flow during periods of increased air flow.

14. The system of claim 1, wherein the scoop has a shape that is selected from one of the following shape types: conical, cylindrical and spherical.

15. The system of claim 1, further comprising a platform, and the plurality of independent subsystems are disposed on the platform.

16. The system of claim 1, wherein each subsystem comprises a plurality of scoops, each of the plurality of scoops being angled in a different direction so as to capture varying air flows.

17. A system for generating electricity, comprising:
a building structure, the building structure being a commercial building structure;
a plurality of independent subsystems structurally integrated within the building structure, at least one of the plurality of independent subsystems integrated within the building structure at ground height, each subsystem comprising:
a vertical oriented tower;
a scoop mounted on the tower and comprising an air intake opening and an air outlet opening; and
turbine blades disposed within the scoop that are activated by air flow from the air intake opening to the air outlet opening of the scoop; and
one or more wind turbines that are operatively connected to the turbine blades of the one or more subsystems to generate electricity.

18. A system for generating electricity, comprising:
a building structure, the building structure being a residential building structure;

a plurality of independent subsystems structurally integrated within the building structure, at least one of the plurality of independent subsystems integrated within the building structure at ground height, each subsystem comprising:
    a vertical oriented tower;
    a scoop mounted on the tower and comprising an air intake opening and an air outlet opening; and
    turbine blades disposed within the scoop that are activated by air flow from the air intake opening to the air outlet opening of the scoop; and
one or more wind turbines that are operatively connected to the turbine blades of the one or more subsystems to generate electricity.

* * * * *